United States Patent [19]
Krieg et al.

[11] Patent Number: 5,325,726
[45] Date of Patent: Jul. 5, 1994

[54] METHOD AND DEVICE FOR MEASURING VOLUME FLOWS IN LIQUIDS AND GASES

[75] Inventors: Gunther Krieg, Karlsruhe; Thomas Dörnhöfer, Karlsbad; Michael Schultz, Herxheim, all of Fed. Rep. of Germany

[73] Assignee: Prof. Dr. Ing. Gunther Krieg, Karlsruhe, Fed. Rep. of Germany

[21] Appl. No.: 878,491

[22] Filed: May 5, 1992

[30] Foreign Application Priority Data
May 5, 1991 [DE] Fed. Rep. Germany ............ 4114650

[51] Int. Cl.$^5$ ................................................ G01F 1/66
[52] U.S. Cl. ............................... 73/861.29; 73/861.27
[58] Field of Search .......... 73/861.08, 861.27, 861.29, 73/861.25, 861.28

[56] References Cited

U.S. PATENT DOCUMENTS

| | | | |
|---|---|---|---|
| 3,209,591 | 10/1965 | Lester et al. | 73/861.29 |
| 3,336,801 | 8/1967 | Snavely | 73/170.13 |
| 4,052,896 | 10/1977 | Lee et al. | 73/861.29 |
| 4,555,951 | 12/1985 | Gutterman | 73/861.28 |
| 4,616,510 | 10/1986 | Moore | 73/861.27 |
| 4,850,220 | 7/1989 | Asano et al. | 73/861.28 X |
| 5,035,147 | 7/1991 | Woodward | 73/861.29 X |
| 5,214,966 | 6/1993 | Delsing | 73/861.28 |

*Primary Examiner*—Richard E. Chilcot, Jr.
*Assistant Examiner*—Elizabeth L. Dougherty
*Attorney, Agent, or Firm*—Antonelli, Terry, Stout & Kraus

[57] ABSTRACT

A method and device for measuring a volume flow of fluids in flow channels using ultrasound, wherein two ultrasonic transducers, each with a different transmitting frequency, are disposed in a flow channel in such a manner that emitted wave trains travel toward one another, with speed vectors of both wave trains having components that are in the flow direction and against the flow direction, and the superimposed signal is evaluated in terms of its position with respect to time.

21 Claims, 2 Drawing Sheets

METHOD AND DEVICE FOR MEASURING VOLUME FLOWS IN LIQUIDS AND GASES

FIELD OF THE INVENTION

The present invention relates to a device and method for measuring volume flows of fluids, especially gases and liquids.

BACKGROUND OF THE INVENTION:

Devices for measurements of the aforementioned type have been marketed by several companies and, for example, such devices include magnetically inductive flow meters (MIF) as well as rotary vane meters, the rotational speed of which are scanned by various means, for example, conductive measurement, the eddy current principle, and an ultrasonic reflexing indexing method.

Additionally, systems using anemometer principles as well as the heat pulse method are known and are used in practice. Furthermore, static ultrasonic methods are used in which ultrasonic transmitters and receivers located in the flow tube by various method as, for example, phase measurement, travel time measurement, frequency measurement and tracking, for measuring flow have been proposed.

The systems of the prior art suffer from the definite disadvantages including excessive energy consumption, excessive production costs, sensitivity to contamination, mechanically moving parts, and insufficiently wide dynamic range, problems with "creep" flows and problems caused by external factors, such as solid particles and air bubbles.

Although known ultrasonic methods solve some of the above-described problems, the ultrasonic methods are characterized by sever demands on the accuracy of mechanical manufacture, high losses caused by multi-reflection, time-intensive searching and regulating procedures, and high energy consumption. For these reasons, these systems cannot be produced with a sufficiently high time resolution at low manufacturing prices.

SUMMARY OF THE INVENTION

The aim underlying the present invention essentially resides in providing an improved method and device in which the above-mentioned disadvantages are eliminated.

According to the present invention, opposing ultrasonic signals of different frequencies are superimposed in the flow after passing through the fluid, and the position of the amplitude minimum and amplitude maximum of the overlap are plotted on the time axis to measure the flow rate and hence the volume flow. This method and the devices used therefore have definite advantages which include short response times, a high dynamic range, suitability for "creep" flows, extremely low energy consumption, and very low production costs.

DETAILED DESCRIPTION

Figure 1:
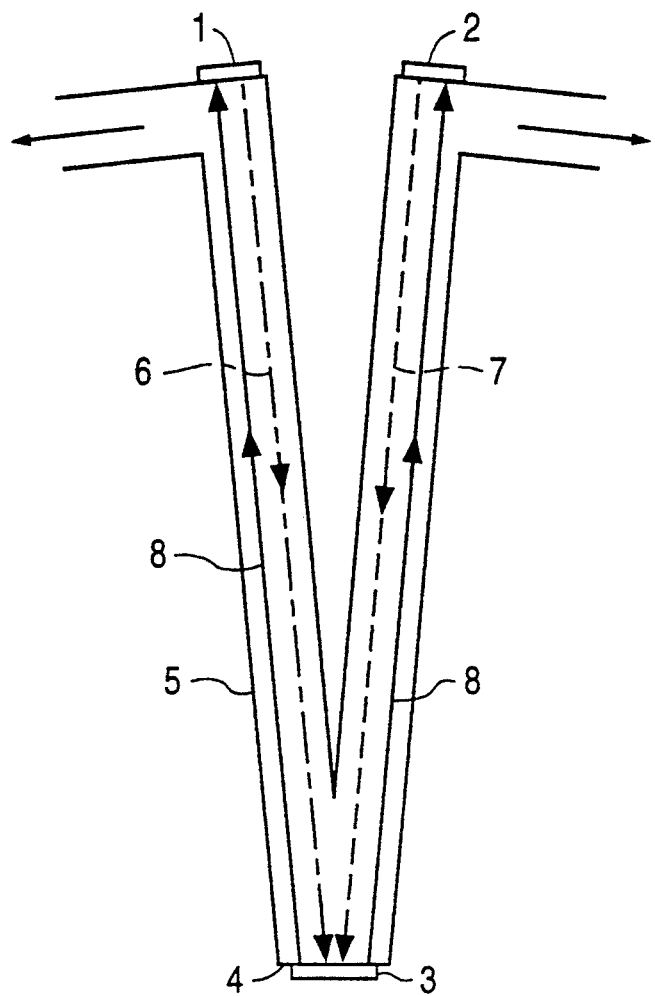
FIG. 1 is a schematic view of a first embodiment of a device for measuring volume flows in liquids and gases.

As respectively shown in FIGS. 1-4, two ultrasonic transducers 1, 2; 9, 10; 17, 18; and 24, 25, with different frequencies, are built or installed in a measuring tube in such a manner that emitted wave trains 6, 7; 13, 14; 21, 22; and 27, 28, travel toward one another. One of the transducers 1, 9, 17, 24 transmits with the flow direction of the medium and the other transducer 2, 10, 18, 25 transmits in a direction opposite the flow. Between the two ultrasonic transducers, 1, 2; 9, 10; 17, 18; and 24, 25, there is either a receiver 3 (FIG. 1) 20 (FIG. 3) and/or a reflector 4 (FIG. 1), 11 (FIG. 2), 19 (FIG. 3) disposed in such a manner that addition of the two ultrasonic signals can take place. In an especially simple construction shown in FIG. 4, the reflector and/or the third sensor can be eliminated. In this case, the received signals are added electrically or one of the two transducers 25 is used as a reflector, whereby sensors 24, 25 can then be simultaneously exposed to signals and the transmitting time of the transducer 24 is selected so that the emitted wave train 28 corresponds to the length of the tube and the second transducer 25 is operated for twice the time, so that the overlap signal 29 is produced at the reflection or addition point, with the signal being received by the sensor 24. The reflector 4, 11 or 19 must be mounted so that it reflects signals 8, 15, 16, 21, 22 to one or both of the transducers or to a separate transducer. The transducers can also be wired as receivers. By adding the two transmitted signals 30, 31 of different frequencies, an overlap signal 32 can be obtained as the sum, with the signal being used to determine the flow rate of the medium and thus provide a measure of the flow volume.

In order to determine the thermal lengthwise expansion of the tube, the tube length is determined by a travel time method in which a pulse is sent by one of the transducers 1, 9, 17, 24 or 2, 10, 18, 25 and this pulse, after reflection at sensors 2, 10, 20, 25 or 1, 9, 20, 24 or at reflectors 11 and 14 is received and the travel time dt is determined in accordance with the following relationship:

$$l = c/dt,$$

where:

c = the speed of sound of the medium.

By virtue of the above relationship, the lengthwise expansion can be taken into account in calculating the throughput.

Figure 2:
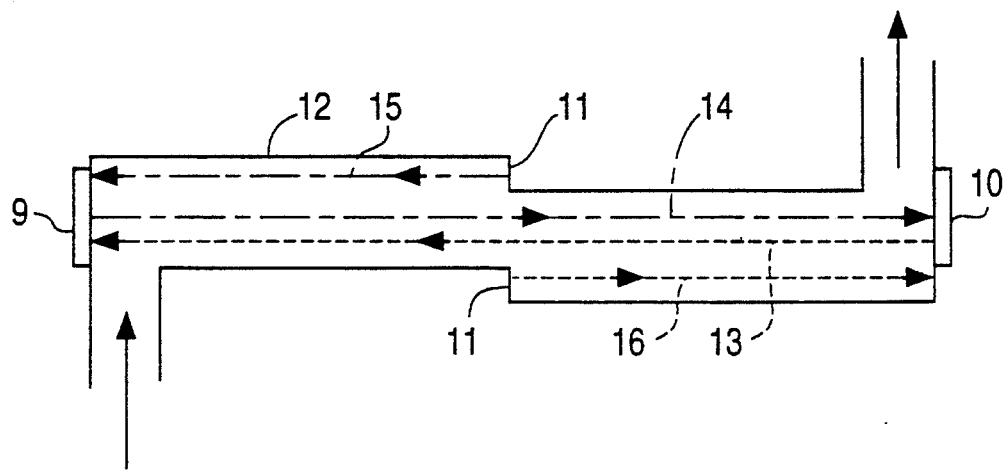
FIG. 2 is a schematic view of another embodiment of a device for measuring volume flows in liquids and gases.
Figure 3:
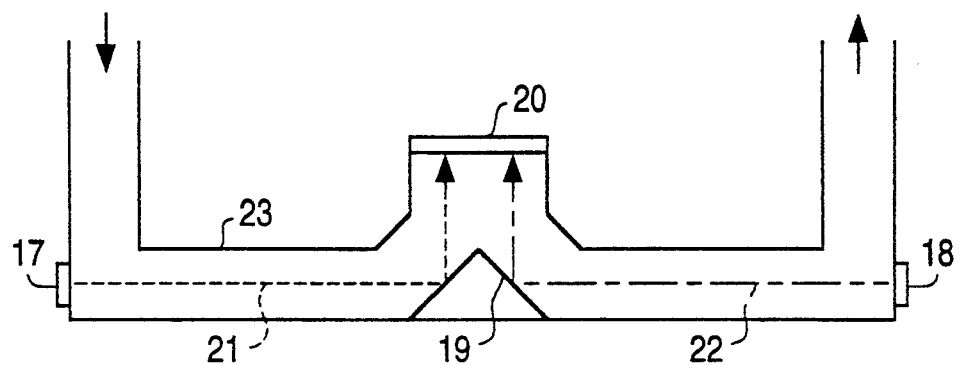
FIG. 3 is a schematic view of a further embodiment of a device for measuring volume flows in liquids and gases.
Figure 4:
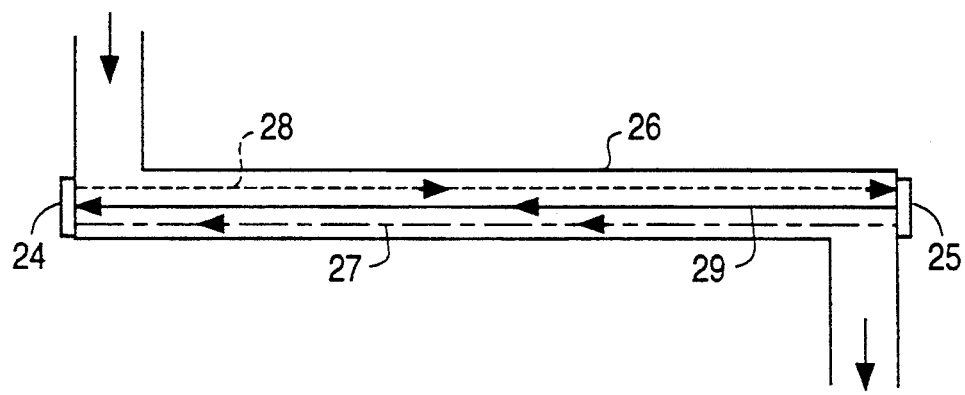
FIG. 4 is a schematic view of a still further embodiment of a device for measuring volume flows in liquids and gases.

FIG. 1 shows a system according to the invention with the sensors 1, 2, 3 and flow channel 5, with FIGS. 2, 3, and 4 respectively depicting mechanical variations of the system of FIG. 1, with the arrangement of FIG. 2 including a beam splitter and the arrangement of FIG. 3 including a beam deflector. In FIG. 4, for the purpose of having a measuring tube 26 which is as straight as possible, this method is not used and the signals are added electrically or one of the two sensors 25 is used as a reflector and overlap point.

According to FIG. 1, two ultrasonic sensors 1, 2 which also act as ultrasonic transducers and which are excited by different frequencies are built into a measuring tube 5 in such a manner that the two transmitted wave trains 6, 7 travel toward one another and are bounced back by the reflector 4 to at least one of the ultrasonic transducers 1, 2. Alternatively, the transducer 3 can be used for direct detection of ultrasonic signals 6, 7 of ultrasonic transducers 1, 2. To evaluate the ultrasonic signals, the overlap signal is used to determine its position on the time axis, which is a measure of the flow volume.

According to FIG. 2, two ultrasonic sensors 9, 10 that act as ultrasonic transducers and are excited by different frequencies are built into a measuring tube 12 in such a manner that the wave trains 13, 14 travel toward one another and are reflected by a beam splitter 11 in such a fashion that a portion of the ultrasonic signal 15, 16 travels back on itself. A reflected partial beam 15 or 16 from sensors 9 or 10 and a non-reflecting partial beam 13 or 14 from sensors 10 or 9 are superimposed and received at sensors 9 or 10, so that the superimposed signal can be evaluated in terms of its position with respect to time, which is an indication of a flow volume.

According to FIG. 3, two ultrasonic sensors 17, 18 that act as ultrasonic transducers and which are excited at different frequencies are built into a measuring tube 23 in such a manner that wave trains 21, 22 travel toward one another and are reflected by a reflector 19 in such a fashion that they can be detected at a sensor 20. For evaluation, the overlap signal is measured in terms of its position on the time axis, which is an indication of the flow volume.

According to FIG. 4, two ultrasonic sensors 21, 25, which act as ultrasonic transducers and are excited by different frequencies are built into a measuring tube 26 in such a fashion that the wave trains 27, 28 that are emitted travel toward one another and the signals received by ultrasonic sensors 25, 24 are electrically added. Another possibility for signal superposition consists in the fact that one of the two transmitters 25 is used as a reflector, whereupon the ultrasonic sensors 24, 25 are exposed simultaneously to signals and the transmitting time from the transmitter 24 is selected so that the transmitted wave train 28 corresponds to the length of the tube and the second transmitter 25 is operated for twice the time, so that the overlap signal 29 is produced at the reflection point which is received by sensor 24 so that the overlap signal can be evaluated in terms of its position on the time axis, which is a measure of the flow volume.

Figure 5:
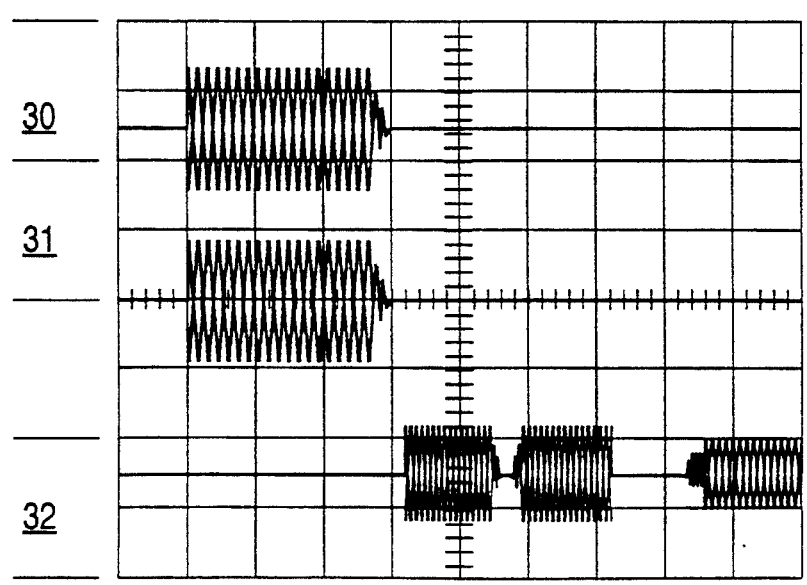
FIG. 5 is a graphical illustration of transmission signals and frequencies in the device of the present invention.

FIG. 5 shows the transmission signals of sensors 1, 2, 9, 10, 17, 18, 24 and 25. As frequencies 30, 31, for example, f1-1.6 MHz and f2-1.61 MHz may be selected. Frequencies 30, 31 corresponding to frequencies f1 and f2 should be selected so that, at the highest throughput that can be expected, the definite phase difference of the initial amplitudes of the two frequencies $f_1$, and $f_2$ at the overlap point that, that is, the difference between the two transmitted signals at the beginning of the transmission between the reflector 4, 11 or receiver 3, 19, 20, 24, is less than 180°. A precondition for this is an n-phase transmission of the starting amplitudes of the wave train 6, 7; 13, 14; 21, 22; 27, 28. The differential frequency should be selected so that the period of the overlap signal is twice as large as the travel time of the sound through the measuring tube from the transmitter to the overlap point; however, this is not essential.

We claim:

1. A method for measuring a volume flow of fluids in flow channels using ultrasound, the method comprising the steps of disposing two ultrasonic transducers each having a different transmitting frequency in the respective flow channels manner that wave trains emitted by the respective ultrasonic transducers travel toward one another and speed vectors of the respective wave trains have components in the flow direction and against the flow direction; providing a superimposed signal; and evaluating a superimposed signal with respect to time.

2. The method according to claim 1, wherein a phase difference between initial amplitudes of the wave trains when transmission is zero.

3. The method according to claim 1, wherein initial amplitudes of the wave trains have a phase difference.

4. The method according to one of claims 1, 2 or 3, wherein the step of providing a superimposed signal includes superimposing the wave trains by a reflector.

5. The method according to claim 4, further comprising the step of feeding the superimposed signal of the reflector back to at least one of the two ultrasonic transmitters.

6. The method according to one of claims 1, 2 or 3, further comprising the step of utilizing a third sensor to superimpose an detect the signal.

7. The method according to claim 6, further comprising the step of feeding the signal back to the third sensor by a reflector.

8. The method according one of claims 1, 2 or 3, electrically adding received signals.

9. The method according to one of claims 1, 2 or 3, wherein one of the two ultrasonic transducers serves as a reflector and define an overlap point for the wave trains.

10. The method according to claim 9, wherein a distance traveled by ultrasonic signals from the ultrasonic transducers is determined in dependence upon a travel time for the respective signals and wherein the distance traveled is utilized for calculating the volume flow.

11. Device for measuring a volume flow of fluids in flow channels using ultrasound, the device comprising two ultrasonic transducers each having a different transmitting frequency disposed in a flow channel in such a manner that wave train emitted by the ultrasonic transducers travel toward one another and have speed vectors with components in a flow direction and against the flow direction, and an evaluator for evaluating a superimposed signal with respect to time.

12. Device according to claim 11, wherein a phase difference of initial amplitudes of the wave trains is zero when transmission begins.

13. Device according to claim 11, wherein the initial amplitudes of the wave trains have a phase difference.

14. Device according to one of claims 11 12 or 13, further comprising a reflector for superimposing the wave trains.

15. Device according to claim 14, wherein the superimposed signal of the reflector is fed back to at least one of the two ultrasonic transducers.

16. Device according to one of claim 11, 12 or 13, wherein a further transducer is provided for superimposing and for detecting the wave trains.

17. Device according to one of claims 11, 12 or 13, further comprising a beam splitter for reflecting the wave trains in such a manner that a portion of an ultrasonic signal and in each case a reflected partial beam from one of the ultrasonic transducers and a partial nonreflected beam from the other of the ultrasonic transducers are superimposed and received at said one of said ultrasonic transducers.

18. Device according to one of claims 11, 12 or 13, wherein the wave trains are fed to a further ultrasonic transducer by a reflector.

19. Device according to one of claims 11, 12 or 13, means are provided for electrically adding the wave trains.

20. Device according to one of claims 11 12, or 13, wherein one of the two ultrasonic transducers serve as a reflector and defines an overlap point.

21. Device according to one of claims 11, 12 or 13, wherein a distance traveled by the wave trains is determined in dependence upon a travel time, and wherein the travel time is utilized for calculating the volume flow.

* * * * *